US011854203B1

(12) United States Patent
Gafni et al.

(10) Patent No.: US 11,854,203 B1
(45) Date of Patent: Dec. 26, 2023

(54) CONTEXT-AWARE HUMAN GENERATION IN AN IMAGE

(71) Applicant: Meta Platforms, Inc., Menlo Park, CA (US)

(72) Inventors: Oran Gafni, Ramat Gan (IL); Lior Wolf, Herzliya (IL)

(73) Assignee: Meta Platforms, Inc., Menlo Park, CA (US)

( * ) Notice: Subject to any disclaimer, the term of this patent is extended or adjusted under 35 U.S.C. 154(b) by 532 days.

(21) Appl. No.: 17/127,399

(22) Filed: Dec. 18, 2020

(51) Int. Cl.
*G06T 7/11* (2017.01)
*G06N 20/00* (2019.01)
*G06T 7/00* (2017.01)

(52) U.S. Cl.
CPC .............. *G06T 7/11* (2017.01); *G06N 20/00* (2019.01); *G06T 7/00* (2013.01)

(58) Field of Classification Search
CPC .............. G06T 7/11; G06T 7/00; G06N 20/00
See application file for complete search history.

(56) References Cited

U.S. PATENT DOCUMENTS

| | | | | |
|---|---|---|---|---|
| 2011/0285748 A1* | 11/2011 | Slatter | ................... | G06T 11/60 345/629 |
| 2013/0094780 A1* | 4/2013 | Tang | ................. | G06T 7/97 382/284 |
| 2019/0289225 A1* | 9/2019 | Vonikakis | .............. | H04N 5/2621 |
| 2020/0234034 A1* | 7/2020 | Savchenkov | ............ | G06V 10/82 |
| 2020/0242774 A1* | 7/2020 | Park | ....................... | G06N 3/045 |
| 2021/0065418 A1* | 3/2021 | Han | ........................ | G06T 7/73 |
| 2021/0097691 A1* | 4/2021 | Liu | ....................... | G06V 10/764 |
| 2021/0334935 A1* | 10/2021 | Grigoriev | ............. | G06T 3/0093 |
| 2022/0012568 A1* | 1/2022 | Pardeshi | ............... | G06N 3/045 |

OTHER PUBLICATIONS

Andriluka, et al., 2d Human Pose Estimation: New Benchmark and State of the Art Analysis, CVPR2014, 8 pages, 2014.
Balakrishnan, et al., Synthesizing Images of Humans in Unseen Poses, CVPR paper provided by the Computer Vision Foundation, pp. 8340-8348.
Barratt et al., A Note on the Inception Score, arXiv preprint arXiv:1801.01973v2, 9 pages, Jun. 21, 2018.
Cao, et al., VGGFace2: A dataset for Recognising Faces Across Pose and Age, arXiv preprint arXiv:1710.08092v2, 11 pages, May 13, 2018.

(Continued)

*Primary Examiner* — Asghar H Bilgrami
(74) *Attorney, Agent, or Firm* — Baker Botts L.L.P.

(57) ABSTRACT

In one embodiment, a method includes receiving a first image depicting a context including one or more persons having one or more respective poses, receiving a second image depicting a target person having an original pose, where the target person is to be inserted into the context depicted in the first image, generating a target segmentation mask specifying a new pose for the target person in the context of the first image based on the first image, generating a third image depicting the target person having the new pose based on the second image and the target segmentation mask, and generating an output image based on the first image and the third image, the output image depicting the one or more persons having the one or more respective poses and the target person having the new pose.

20 Claims, 7 Drawing Sheets

(56) References Cited

OTHER PUBLICATIONS

Cao, et al., OpenPose: Realtime Multi-Person 2D Pose Estimation Using Part Affinity Fields, In arXiv preprint arXiv:1812.08008v2, 14 pages, May 30, 2019.

Chan, et al., Everybody Dance Now, arXiv preprint arXiv:1808.07371, UC Berkeley, pp. 5933-5942.

Chao, et al., Generative Models for Pose Transfer, arXiv preprint arXiv:1806.09070v1, 8 pages, Jun. 24, 2018.

Dong, et al., Soft-gated Warping-Gan for Pose-Guided Person Image Synthesis, arXiv:1810.11610v2, 17 pages, Jan. 11, 2019.

Esser, et al., Towards Learning a Realistic Rendering of Human Behavior, in ECCV Workshop, 17 pages, 2018.

Esser, et al., A Variational U-Net for Proceedings of the IEEE Conference Conditional Appearance and Shape Generation, in on Computer Vision, pp. 8857-8866.

Gafni, et al., Live Face De-Identification in Video, in the IEEE International Conference on Computer Vision (ICCV), 10 pages.

Gafni, et al., Wish You Were Here: Context-Aware Human Generation, arXiv:2005.10663v1, 17 pages, May 21, 2020.

Gong, et al., Look into Person: Self-Supervised Structure-Sensitive Learning and a New Benchmark for Human Parsing, in the IEEE Conference on Computer Vision and Pattern Recognition (CVPR), 9 pages.

Guler, et al., Dense-Pose: Dense Human Pose Estimation in the Wild, in the IEEE Conference on Computer Vision (CVPR), pp. 7297-7306.

Kanazawa, et al., Learning 3d Human Dynamics from Video, UC Berkeley, CVPR, 10 pages.

Li, et al., Multi-Human Parsing in the Wild, arXiv preprint arXiv:1705.07206v2, 19 pages, Mar. 16, 2018.

Li, et al., Dense intrinsic appearance flow for human pose transfer, CVPR, pp. 3693-3702.

Liang, et al., Look into Person: Joint Body Parsing & Pose Estimation Network and a New Benchmark, arXiv:1804.01984v1, 14 pages, Apr. 5, 2018.

Liu, et al., Deepfashion: Powering Robust Clothes Recognition and Retrieval with Rich Annotations, in Proceedings of IEEE Conference on Computer (CVPR), 9 pages.

Ma, et al., Pose Guided Person Image Generation, Neural Information Processing Systems, 11 pages, 2017.

Park, et al., Semantic Image Synthesis with Spatially-Adaptive Normalization, in Proceedings of the IEEE Conference on Computer Vision, 10 pages.

Pumarola, et al., Unsupervised Person Image Synthesis in Arbitrary Poses, in the IEEE Conference on Computer Vision (CVPR), pp. 8620-8628.

Salimans, et al., Improved Techniques for Training Gans, arXiv:1606.03498v1, 10 pages, Jun. 10, 2016.

Siarohin, et al., Deformable Gans for Pose-Based Human Image Generation, In Proceedings of the IEEE Conference on Computer Vision, pp. 3408-3416.

Ulyanov, et al., Instance Normalization: The Missing Ingredient for Fast Stylization, arXiv preprint arXiv:1607.08022v3, 6 pages, Nov. 6, 2017.

Wang, et al., Video-to-Video Synthesis, arXiv:1808.06601v2, 14 pages, Dec. 3, 2018.

Wang, et al., High-Resolution Image Synthesis and Semantic Manipulation with Conditional Gans, in Proceedings of the IEEE Conference, pp. 8798-8807.

Wang, et al., Image Quality Assessment: From Error Visibility to Structural Similarity, IEEE transactions on image processing, 13(4):1-14, Apr. 2004.

Yang, et al., Pose Guided Human Video Generation, ECCV, 16 pages, 2018.

Yang, et al., Articulated Human Detection with Flexible Mixtures of Parts, IEEE Transactions on Pattern Analysis and Machine Intelligence, 35(12):2878-2890, Dec. 2013.

Zhang, et al., the Unreasonable Effectiveness of Deep Features as a Perceptual Metric, CVPR, 10 pages.

Zhao, et al., Understanding Humans in Crowded Scenes: Deep Nested Adversarial Learning and a New Benchmark for Multi-Human Parsing, arXiv:1804.03287v3, 14 pages, Jul. 6, 2018.

Zhu, et al., Progressive Pose Attention Transfer for Person Image Generation, in Proceedings of the IEEE Conference, pp. 2347-2356.

* cited by examiner

CONTEXT-AWARE HUMAN GENERATION IN AN IMAGE

TECHNICAL FIELD

This disclosure generally relates to image processing, and in particular relates to inserting an object into an existing image.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for inserting an object, specifically a human, into an existing image such that the inserted object blends in a photorealistic manner while respecting the semantic context of the scene. Inserting a person into an existing image that comprises one or more person in a seamless manner may be a challenging task because pixels corresponding to the inserted person in an existing image may stand out as being subpar with respect to the quality of the original image parts. Because the invention disclosed herein may generate a semantic map independently, the invention does not require a driving pose or a semantic map to render a novel person. The invention disclosed herein may utilize three machine-learning models. The first machine-learning model may generate a pose of a novel person in an existing image based on contextual cues that pertain to the other persons in the image. The second machine-learning model may render pixels of the novel person and a blending mask. The third machine-learning model may augment a face of the novel person in the generated image to ensure an artifact-free face.

In particular embodiments, a computing device may receive a first image depicting a context comprising one or more persons having one or more respective poses. The computing device may receive a second image depicting a target person having an original pose. The computing device may insert the target person into the context depicted in the first image. A segmentation mask may comprise a semantic pose map channel and a face channel. The semantic pose map channel may comprise n labels corresponding to n segment groups. The segment groups may comprise background, hair, face, torso, upper limbs, upper-body wear, lower-body wear, lower limbs, shoes, or any other suitable segment group. The computing device may extract the face channel based on convex hulls over detected facial keypoints for faces in an image. The face channel may be a binary representation. The computing device may generate a source segmentation mask specifying the one or more respective poses of the one or more persons using one or more pre-trained machine-learning models. The computing device may generate a target segmentation mask specifying a new pose for the target person in the context of the first image by processing the source segmentation mask with a first machine-learning model. In particular embodiments, information regarding a bounding box may also be provided to the first machine-learning model. The bounding box may indicate an area in the first image to which the target person is to be added. In particular embodiments, the bounding box may be determined by a user.

In particular embodiments, the computing device may generate a third image depicting the target person having the new pose based on the second image and the target segmentation mask. To generate the third image, the computing device may segment the target person in the second image into k segment classes. The segment classes may comprise hair, face, upper-body wear, lower-body-wear, skin, shoes, or any other suitable segment class. Each segment class may be captured in a sub-image. The computing device may generate a latent representation by processing the k sub-images with an encoder of a second machine-learning model. The computing device may generate the third image by processing the latent representation and the target segmentation mask by a decoder of the second machine-learning model. The decoder of the second machine-learning model may comprise a plurality of up-sample layers with interleaving segmentation mask input layers. Each of the interleaving segmentation mask input layers may take the target segmentation mask as an input. The decoder of the second machine-learning model may also produce a first blending mask. The first blending mask may be a binary representation indicating an area in the output image that is to be filled by the target person in the third image. The computing device may generate an output image based on the first image and the third image. To generate the output image, the computing device may composite the first image multiplied by an inverse of the first blending mask and the third image multiplied by the first blending mask. The output image may depict the one or more persons having the one or more respective poses and the target person having the new pose.

In particular embodiments, the computing device may refine the face of the target person in the output image. The computing device may generate a first encoding vector corresponding to a face of the target person having an expression in the context of the first image by processing a face crop of the target person from the output image with an encoder of a third machine-learning model. The computing device may generate a second encoding vector representing face features of the target person by processing the second image with a pre-trained machine-learning model. The computing device may generate a temporary image comprising a refined face of the target person by processing the first encoding vector and the second encoding vector with a decoder of the third machine-learning model. The refined face may have the face features of the target person in the second image and the expression of the face of the target person in the output image. The decoder of the third machine-learning model may also produce a second blending mask. The second blending mask represents a blending weight to be applied to the temporary image at each pixel of the output image. The computing device may blend the generated refined face into the output image by multiplying an inverse of the second blending mask to the output image, and by projecting the temporary image multiplied by the second blending mask to the output image.

In particular embodiments, the computing device may train the first machine-learning model, the second machine-learning model and the third machine-learning model with a set of training data. Each training data may comprise a training source image and a training ground truth image. To prepare the set of training data, a plurality of training ground truth images may be collected. Each training ground truth image comprising two or more persons. One or more training source images may be generated per each training ground truth image. Each training source image is generated by removing one of the two or more persons. During a training process of the first machine-learning model, trainable variables of the first machine-learning model may be updated based on a comparison of a first target segmentation mask generated by the first machine-learning model based on a training source image and a second target segmentation mask computed from a corresponding training ground truth image.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
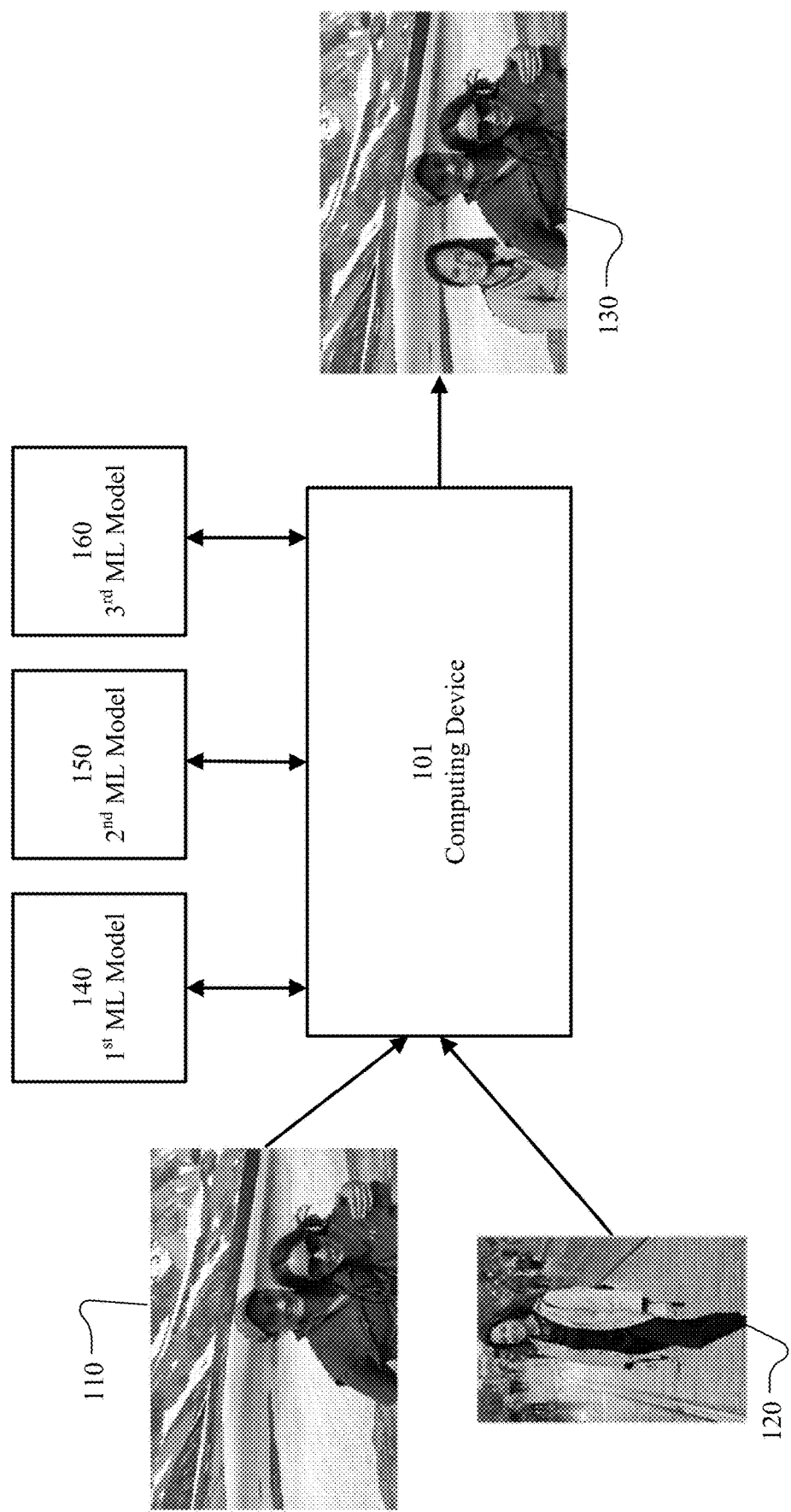
FIG. 1 illustrates an example architecture for inserting a context-adapted person into an existing image that comprises one or more persons.

In particular embodiments, a computing device may insert an object, specifically a human, into an existing image such that the inserted object may blend in a photorealistic manner while respecting the semantic context of the scene. Inserting a person into an existing image that comprises one or more person in a seamless manner may be a challenging task because pixels corresponding to the inserted person in an existing image may stand out as being subpar with respect to the quality of the original image parts. Because the computing device may generate a semantic map independently, the computing device may not need a driving pose or a semantic map to render a novel person. The computing device may utilize three machine-learning models for inserting a novel person into an existing image. The first machine-learning model may generate a pose of a novel person in an existing image based on contextual cues that pertain to the other persons in the image. The second machine-learning model may render pixels of the novel person and a blending mask. The third machine-learning model may augment a face of the novel person in the generated image to ensure an artifact-free face. FIG. 1 illustrates an example architecture for inserting a context-adapted person into an existing image that comprises one or more persons. A computing device 101 may receive a first image 110 depicting a context comprising one or more persons having one or more respective poses. The computing device 101 may receive a second image 120 depicting a target person having an original pose. The target person is to be inserted into the context depicted in the first image 110. The computing device 101 may generate a target segmentation mask specifying a new pose for the target person in the context of the first image 110 using a first machine-learning model 140. The computing device 101 may generate a third image depicting the target person having the new pose by processing the second image 120 and the target segmentation mask with a second machine-learning model 150. The computing device 101 may generate an output image 130 based on the first image 110 and the third image. The computing device 101 may refine a face of the target person in the output image 130 using a third machine-learning model 160. In particular embodiments, the first machine-learning model 140, the second machine-learning model 150 or the third machine-learning model 160 may run on the computing device 101. In particular embodiments, the computing device 101 may communicate with another computing device to run the first machine-learning model 140, the second machine-learning model 150 or the third machine-learning model 160. Although this disclosure describes inserting a context-adapted person into an existing image in a particular manner, this disclosure contemplates inserting a context-adapted person into an existing image in any suitable manner.

In particular embodiments, the computing device 101 may receive a first image 110 depicting a context comprising one or more persons having one or more respective poses. The computing device 101 may receive a second image 120 depicting a target person having an original pose. The target person is to be inserted into the context depicted in the first image. As an example and not by way of limitation, as illustrated in FIG. 1, the computing device 101 accesses a first image 110 comprising two persons. The computing device 101 accesses a second image 120 of a target person having an original pose. The computing device 101 may insert the target person into the first image 110. The target person inserted into the first image 110 may have a new pose and a new facial expression that suit to the context depicted in the first image. Although this disclosure describes accessing the input images in a particular manner, this disclosure contemplates accessing the input images in any suitable manner.

In particular embodiments, a segmentation mask may comprise a semantic pose map channel and a face channel. The semantic pose map channel may comprise n labels corresponding to n segment groups. The segment groups may comprise background, hair, face, torso, upper limbs, upper-body wear, lower-body wear, lower limbs, shoes, or any other suitable segment group. The computing device 101 may extract the face channel based on convex hulls over detected facial key-points for faces in an image. The face channel may be a binary representation. The computing device 101 may generate a source segmentation mask specifying the one or more respective poses of the one or more persons in the first image 110 using one or more pre-trained machine-learning models. The computing device 101 may generate a target segmentation mask specifying a new pose for the target person in the context of the first image 110 by processing the source segmentation mask with a first machine-learning model 140. In particular embodiments, information regarding a bounding box may also be provided to the first machine-learning model 140. The bounding box may indicate an area in the first image 110 to which the target person is to be added. In particular embodiments, the bounding box may be determined by a user. Although this disclosure describes generating a target segmentation mask using a machine-learning model in a particular manner, this disclosure contemplates generating a target segmentation mask using a machine-learning model in any suitable manner.

In particular embodiments, a segmentation mask may comprise a semantic pose map channel and a face channel. The semantic pose map channel may comprise n labels corresponding to n segment groups. The segment groups may comprise background, hair, face, torso, upper limbs, upper-body wear, lower-body wear, lower limbs, shoes, or any other suitable segment group. The computing device 101 may extract the face channel based on convex hulls over detected facial key-points for faces in an image. The face channel may be a binary representation. As an example and not by way of limitation, each pixel in the semantic pose map may have one of eight labels: 0, 36, 72, . . . , 252. These labels represent the background (0), hair, face, torso and upper limbs, upper-body wear, lower-body wear, lower limbs, and finally shoes. For example, a pixel with a label 36 may belong to hair of a person, and a pixel with a label 0 may belong to background. The choice of this reduced number of segment groups may be used to simplify semantic generation, while still supporting detailed image generation. The face channel may be derived from facial key-points. A computing device may extract the face channel by considering the convex hulls over the detected facial key-points. The face channel may be binary and have values that are either 0 or 255. Although this disclosure describes a particular segmentation mask, this disclosure contemplates any suitable segmentation mask.

Figure 2:
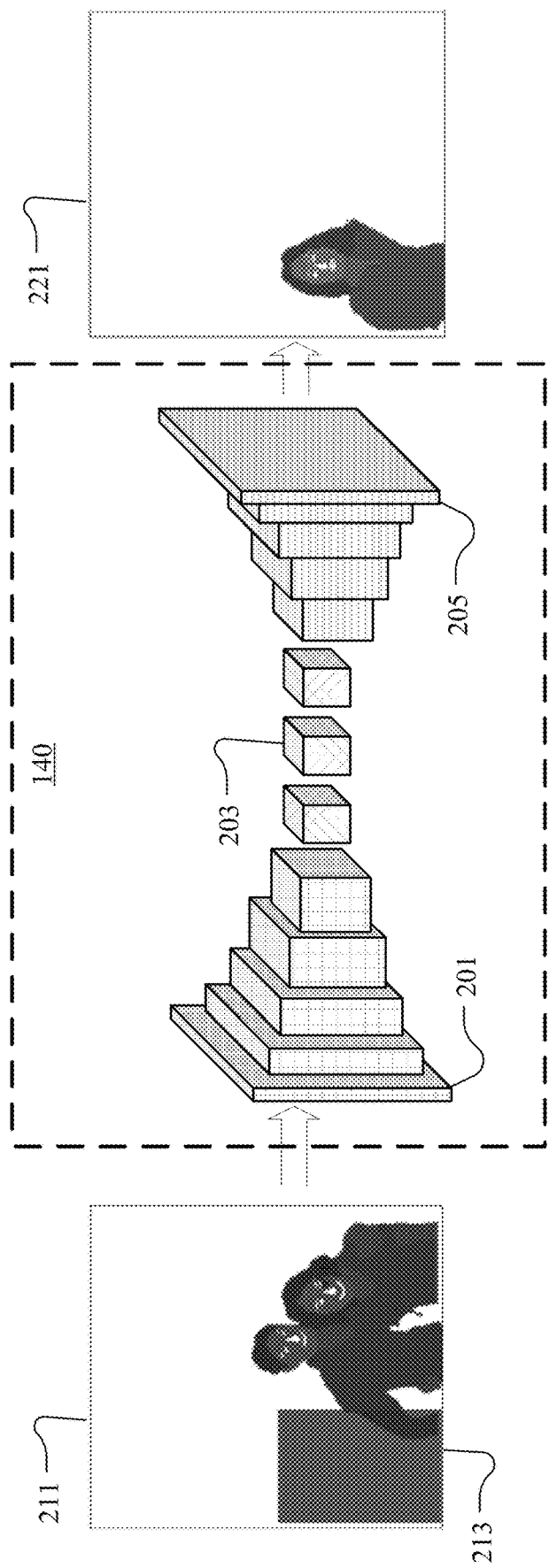
FIG. 2 illustrates an example generation of a target segmentation mask by processing a source segmentation mask with a machine-learning model.

In particular embodiments, the computing device 101 may generate a target segmentation mask specifying a new pose for the target person in the context of the first image based on the first image. To generate the target segmentation mask, the computing device 101 may generate a source segmentation mask specifying the one or more respective poses of the one or more persons using one or more pre-trained machine-learning models. Then, the computing device 101 may process the source segmentation mask with a first machine-learning model. FIG. 2 illustrates an example generation of a target segmentation mask by processing a source segmentation mask with a machine-learning model. As an example and not by way of limitation, illustrated in FIG. 2, the computing device 101 may generate a source segmentation mask 211 from the first image 110. The computing device 101 may generate a target segmentation mask 221 by processing the source segmentation mask 211 with the first machine-learning model 140. The first machine-learning model 140 may comprise down-sample convolution blocks 201, ResNet blocks 203 and up-sample convolution blocks 205. Although this disclosure describes generating a target segmentation mask in a particular manner, this disclosure contemplates generating a target segmentation mask in any suitable manner.

In particular embodiments, the computing device 101 may generate a source segmentation mask 211 specifying the one or more respective poses of the one or more persons using one or more pre-trained machine-learning models. Then, the computing device 101 may process the source segmentation mask 211 with a first machine-learning model 140. As an example and not by way of limitation, continuing with a prior example illustrated in FIG. 2, the computing device 101 may generate a semantic pose map channel of the source segmentation mask 211 by processing the first image 110 with a pre-trained machine-learning model. The semantic pose map channel of the source segmentation mask may comprise labels corresponding to segment groups for the persons in the first image 110. The computing device 101 may generate a face channel of the source segmentation mask 211 by processing the first image 110 with another pre-trained machine-learning model. The face channel of the source segmentation mask 211 may be derived based on the facial key-points of the persons in the first image 110. Although the source segmentation mask 211 is depicted as a single entity, the source segmentation mask 211 comprises a semantic pose map channel and a face channel. The computing device 101 may process the source segmentation mask 211 with the first machine-learning model 140 to generate the target segmentation mask 221. The target segmentation mask 221 may correspond to the target person to be added to the first image 110. Although the target segmentation mask 221 is depicted as a single entity, the target segmentation mask 221 comprises a semantic pose map channel and a face channel. The first machine-learning model 140 may have an encoder-decoder architecture. The first machine-learning model 140 may not use VGG feature-matching loss because of an uncertainty of the generated person. Given a source image, a large number of conceivable options for a new person to be generated in the context of the other persons in the scene may be possible. The first machine-learning model 140 may use a derivative regularization loss applied over the semantic pose map channel of the target segmentation mask 211. The derivative regularization loss may minimize the high-frequency patterns in the generated semantic pose map. Although this disclosure describes generating a target segmentation mask using a machine-learning model in a particular manner, this disclosure contemplates generating a target segmentation mask using a machine-learning model in any suitable manner.

In particular embodiments, information regarding a bounding box may also be provided to the first machine-learning model 140. The bounding box may indicate an area in the first image to which the target person is to be added. In particular embodiments, the bounding box may be determined by a user. As an example and not by way of limitation, continuing with a prior example illustrated in FIG. 2, a user may determine an area in the source image 110 to which the target person is to be added. The area may be encoded in an additional channel as a binary-encoded bounding box 213 and may be provided to the first machine-learning model 140 as an input. In particular embodiments, the computing device 101 may determine the bounding box 213 when the user input for the bounding box is missing. Although this disclosure describes providing a bounding box to a machine-learning model as an input in a particular manner, this disclosure contemplates providing a bounding box to a machine-learning model as an input in any suitable manner.

Figure 3:
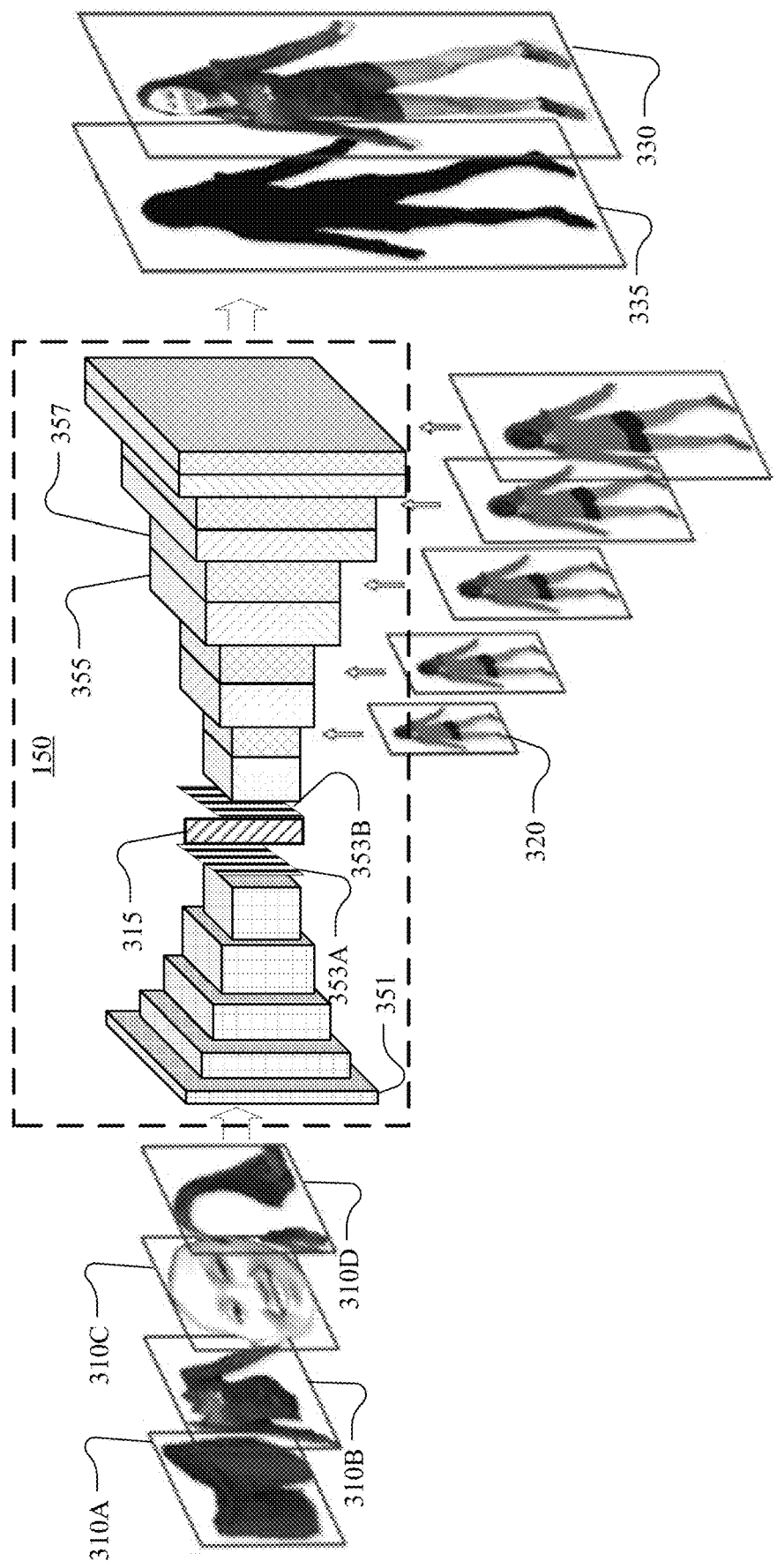
FIG. 3 illustrates an example generation of an output image based on a second image and a target segmentation mask using a machine-learning model.

In particular embodiments, The computing device 101 may generate an output image depicting the one or more persons having the one or more respective poses and the target person having the new pose. First, the computing device 101 may generate a third image depicting the target person having the new pose based on the second image and the target segmentation mask. To generate the third image, the computing device 101 may segment the target person in the second image into k segment classes. The segment classes may comprise hair, face, upper-body wear, lower-body-wear, skin, shoes, or any other suitable segment class. Each segment class may be captured in a sub-image. The computing device 101 may generate a latent representation by processing the k sub-images with an encoder of a second machine-learning model 150. The computing device 101 may generate the third image by processing the latent representation and the target segmentation mask by a decoder of the second machine-learning model 150. The computing device may generate an output image based on the first image and the third image. The output image may depict the one or more persons having the one or more respective poses and the target person having the new pose. FIG. 3 illustrates an example generation of an output image based on a second image and a target segmentation mask using a machine-learning model. As an example and not by way of limitation, illustrated in FIG. 3, the computing device 101 may generate sub-images 310A, 310B, 310C, and 310D based on the second image. Each of the sub-images comprise a corresponding segment of the target person in the second image. Although FIG. 3 depicts four sub-images 310A, 310B, 310C and 310D, any suitable number of sub-images may be generated. The computing device 101 may generate a latent representation 315 by processing the sub-images 310A, 310B, 310C, and 310D with an encoder of the second machine-learning model 150. The encoder of the second machine-learning model 150 may comprise down-sample convolution blocks 351 and a fully connected layer 353A. The computing device 101 may generate a third image 330 and a first blending mask 335 by processing the latent representation 315 and the target segmentation mask 320 by a decoder of the second machine-learning model 150. The decoder of the second machine-learning model 150 may comprise a fully connected layer 353B and up-sample convolution blocks 355 with interleaving segmentation mask input blocks 357. The computing device 101 may generate an output image by blending the first image and the third image 330 using the first blending mask 335. Although this disclosure describes generating an output image in a particular manner, this disclosure contemplates generating an output image in any suitable manner.

In particular embodiments, the computing device 101 may segment the target person in the second image into k segment classes. The segment classes may comprise hair, face, upper-body wear, lower-body-wear, skin, shoes, or any other suitable segment class. Each segment class may be captured in a sub-image. As an example and not by way of limitation, continuing with a prior example illustrated in FIG. 3, the computing device 101 may generate a plurality of sub-images 310A, 310B, 310C and 310D. Each of the sub-images may correspond to a segment class. A first sub-image 310A may comprise a lower-body wear of the target person in the second image. A second sub-image 310B may comprise an upper-body wear of the target person in the second image. A third sub-image 310C may comprise a face of the target person in the second image. A fourth sub-image 310D may comprise hair of the target person in the second image. The sub-images may be of identical size. The computing device 101 may generate the sub-images 310A, 310B, 310C and 310D by processing the second image with a pre-trained machine-learning model. Although this disclosure describes generating sub-images corresponding to segment classes in a particular manner, this disclosure contemplates generating sub-images corresponding to segment classes in any suitable manner.

In particular embodiments, the computing device 101 may generate a latent representation by processing the k sub-images with an encoder of a second machine-learning model. As an example and not by way of limitation, continuing with a prior example illustrated in FIG. 3, the computing device 101 may process the sub-images 310A, 310B, 310C and 310D with an encoder of the second machine-learning model 150 to generate a latent representation 315. The encoder of the second machine-learning model 150 may comprise down-sample convolution blocks 351 and a fully connected layer 353A. The latent representation 315 may encode information for the segment classes of the target person in the second image. Although this disclosure describes generating a latent representation in a particular manner, this disclosure contemplates generating a latent representation in any suitable manner.

In particular embodiments, the computing device 101 may generate the third image by processing the latent representation and the target segmentation mask by a decoder of the second machine-learning model. The third image may comprise the target person with a new pose and a new facial expression. The new pose and the new facial expression of the target person in the third image may suit the context of the first image. As an example and not by way of limitation, continuing with a prior example illustrated in FIG. 3, the computing device 101 may process the latent representation 315 with a decoder of the second machine-learning model 150. The decoder of the second machine-learning model 150 may comprise a plurality of up-sample blocks 355 with interleaving segmentation mask input blocks 357. Each of the interleaving segmentation mask input block 357 may take the target segmentation mask 320 as an input. The target segmentation mask 320 may have been generated by processing a source segmentation mask with a first machine-learning model 140. In particular embodiments, the interleaving segmentation mask input blocks 357 may be SPADE blocks. Although this disclosure describes generating an image comprising the target person with a new pose and a new expression in a particular manner, this disclosure contemplates an image comprising the target person with a new pose and a new expression in any suitable manner.

In particular embodiments, the decoder of the second machine-learning model may also produce a first blending mask. The first blending mask may be a binary representation indicating an area in the output image that is to be filled by the target person in the third image. The computing device 101 may generate an output image based on the first image and the third image. To generate the output image, the computing device 101 may composite the first image multiplied by an inverse of the first blending mask and the third image multiplied by the first blending mask. The output image may depict the one or more persons having the one or more respective poses and the target person having the new pose and the new facial expression. As an example and not by way of limitation, continuing with a prior example illustrated in FIG. 3, the computing device 101 may generate the third image 330 and the first blending mask 335 by processing the latent representation 315 and the target segmentation mask 320 with the decoder of the second machine-learning model 150. The first blending mask 335 may comprise pixels in the area that is to be filled by the target person in the third image 330 represented by a value 255. In particular embodiments, the value may be any non-zero value. The first blending mask 335 may comprise pixels outside the area that is to be filled by the target person in the third image 330 represented by a value 0. The computing device 101 may generate an output image by compositing the first image multiplied by an inverse of the first blending mask 335 and the third image 330 multiplied by the first blending mask 335. Although this disclosure describes generating an output image based on the first image and the third image using a blending mask in a particular manner, this disclosure contemplates generating an output image based on the first image and the third image using a blending mask in any suitable manner.

Figure 4:
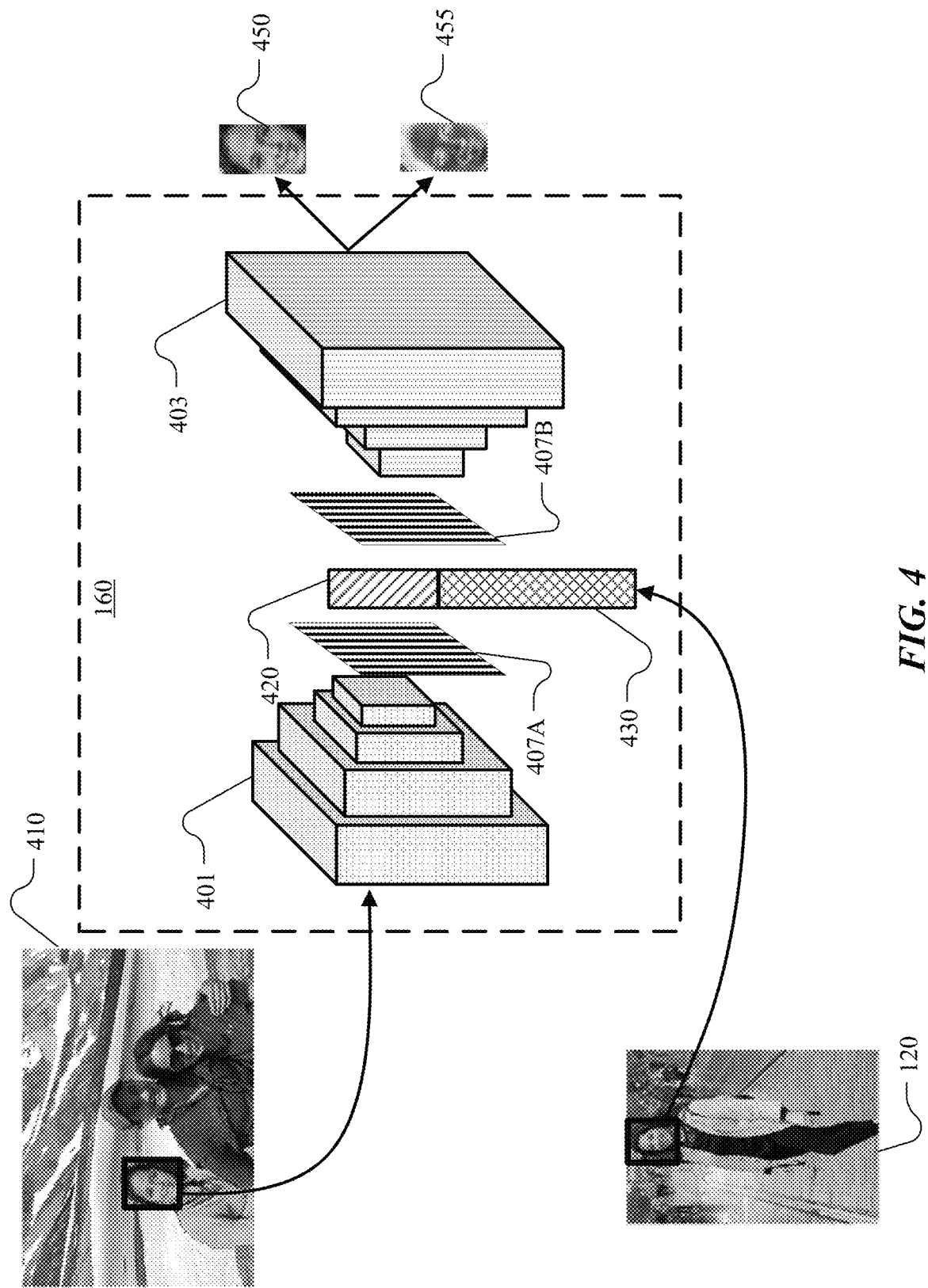
FIG. 4 illustrates an example refinement of the target person's face in the output image.

In particular embodiments, the computing device 101 may refine the face of the target person in the output image. The computing device 101 may generate a first encoding vector corresponding to a face of the target person having an expression in the context of the first image by processing a face crop of the target person from the output image with an encoder of a third machine-learning model 160. The computing device 101 may generate a second encoding vector representing face features of the target person by processing the second image with a pre-trained machine-learning model. The computing device 101 may generate a temporary image comprising a refined face of the target person by processing the first encoding vector and the second encoding vector with a decoder of the third machine-learning model 160. The decoder of the third machine-learning model 160 may also produce a second blending mask. The computing device 101 may blend the generated refined face into the output image. FIG. 4 illustrates an example refinement of the target person's face in the output image. As an example and not by way of limitation, illustrated in FIG. 4, the computing device 101 may take a first face crop of the target person from an output image 410 generated by blending the first image and the third image generated by the second machine-learning model 150. The computing device 101 may generate the first encoding vector 420 by processing the first face crop with an encoder of the third machine-learning model 160. The encoder of the third machine-learning model 160 may comprise down-sample convolution blocks 401 and a fully connected layer 407A. The computing device 101 may access the second face crop of the target person from the second image 120. The computing device 101 may generate a second encoding vector 430 by processing the second face crop with a pre-trained machine-learning model. The computing device 101 may generate a temporary image 450 and a second blending mask 455 by processing the first encoding vector 420 and the second encoding vector 430 with a decoder of the third machine-learning model 160. The decoder of the third machine-learning model 160 may comprise a fully connected layer 407B and up-sample convolution blocks 403. The computing device 101 may blend the generated refined face in the temporary image 450 into the output image 410 by multiplying an inverse of the second blending mask 455 to the output image 410, and by projecting the temporary image 450 multiplied by the second blending mask 455 to the output image 410. Although this disclosure describes refining the face of the target person in the output image using a machine-learning model in a particular manner, this disclosure contemplates refining the face of the target person in the output image using a machine-learning model in any suitable manner.

In particular embodiments, the computing device 101 may generate a first encoding vector corresponding to a face of the target person having an expression in the context of the first image. The computing device 101 may access a first face crop of the target person from the output image. The computing device 101 may generate the first encoding vector by processing the first face crop with an encoder of a third machine-learning model. As an example and not by way of limitation, continuing with a prior example illustrated in FIG. 4, the computing device may access a first face crop of the target person in the generated output image 410. The output image 410 may have been generated by blending the first image 110 and the third image generated by the second machine-learning model 150. The computing device 101 may process the first face crop with the encoder of the third machine-learning model 160 to generate a first encoding vector 420. The first encoding vector 420 may represent the facial features of the target person having the expression in the context of the first image. Although this disclosure describes generating a first encoding vector using a machine-learning model in a particular manner, this disclosure contemplates generating a first encoding vector using a machine-learning model in any suitable manner.

In particular embodiments, the computing device 101 may generate a second encoding vector representing facial features of the target person by processing the second image with a pre-trained machine-learning model. As an example and not by way of limitation, continuing with a prior example illustrated in FIG. 4, the computing device 101 may access the second face crop of the target person in the second image 120. The computing device 101 may generate the second encoding vector 430 by processing the second face crop with a pre-trained machine-learning model. In particular embodiments, the computing device 101 may generate the second encoding vector 430 by processing the second image 120 with the pre-trained machine-learning model. The second encoding vector may represent facial features of the target person in the second image. The facial features may define a facial identity of the target person. While the first encoding vector was generated based on a generated face of the target person, the second encoding vector may be generated based on a real face of the target person. Although this disclosure describes generating a second encoding vector based on the second image in a particular manner, this disclosure contemplates generating a second encoding vector based on the second image in any suitable manner.

In particular embodiments, the computing device 101 may generate a temporary image comprising a refined face of the target person by processing the first encoding vector and the second encoding vector with a decoder of the third machine-learning model. The refined face may have the face features of the target person in the second image and the expression of the face of the target person in the output image. As an example and not by way of limitation, continuing with a prior example illustrated in FIG. 4, the computing device 101 may combine the first encoding vector 420 and the second encoding vector 430. The computing device 101 may generate a temporary image 450 comprising a face of the target person by processing the combined encoding vectors 420 and 430 with a decoder of the third machine-learning model 160. The decoder of the third machine-learning model 160 may comprise a fully connected layer 407B and up-sample blocks 403. The face in the temporary image 450 may have the facial features of the target person's face in the second image 120 and the expressions of the target person's face in the output image 410. Although this disclosure describes generating an image of a face with the facial features in the second image and the expression in the output image in a particular manner, this disclosure contemplates an image of a face with the facial features in the second image and the expression in the output image in any suitable manner.

In particular embodiments, the decoder of the third machine-learning model may also produce a second blending mask. The second blending mask represents a blending weight to be applied to the temporary image at each pixel of the output image. The computing device 101 may blend the generated refined face into the output image by multiplying an inverse of the second blending mask to the output image, and by projecting the temporary image multiplied by the second blending mask to the output image. As an example and not by way of limitation, continuing with a prior example illustrated in FIG. 4, the computing device 101 may refine the face of the target person in the output image 410 by blending the refined face in the temporary image 450 into the output image 410. The computing device 101 may multiply an inverse of the second blending mask 455 with the output image 410. The computing device 101 may project the temporary image 450 multiplied by the second blending mask 455 into the output image 410. Although this disclosure describes refining a face of the target person in the output image in a particular manner, this disclosure contemplates refining a face of the target person in the output image in any suitable manner.

Figure 5:
FIG. 5 illustrates an example process of generating training data.
Figure 5:
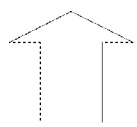
Figure 5:

In particular embodiments, a computing device 101 may train the first machine-learning model, the second machine-learning model or the third machine-learning model with a set of training data. Each training data may comprise a training source image and a training ground truth image. To prepare the set of training data, a plurality of training ground truth images may be collected. Each training ground truth image may comprise two or more persons. One or more training source images may be generated per each training ground truth image. Each training source image is generated by removing one of the two or more persons. FIG. 5 illustrates an example process of generating training data. As an example and not by way of limitation, illustrated in FIG. 5, a computing device may access a training ground truth image 510 comprising three persons. The computing device may generate a corresponding training source image 520 by removing one person from the training ground truth image 510. The computing device may generate other training source images by removing each of the other persons in the training ground truth image 510. Although this disclosure describes preparing training data for training the machine-learning models in a particular manner, this disclosure contemplates preparing training data for training the machine-learning models in any suitable manner.

In particular embodiments, the computing device may update the trainable variables of the first machine-learning model at each iteration of a training process of the first machine-learning model. The computing device may compare a first target segmentation mask generated by the first machine-learning model based on a training source image and a second target segmentation mask computed from a corresponding training ground truth image. The computing device may update the trainable variables of the first machine-learning model based on the comparison. In particular embodiments, the computing device may update the trainable variables of the second machine-learning model at each iteration of a training process. The computing device may update the trainable variables of the third machine-learning model at each iteration of a training process. Updating the trainable variables may be based on a comparison between a first output of each of the machine-learning models based on a training source image and a second output computed based on a corresponding training ground truth image. Although this disclosure describes updating the trainable variables of a machine-learning model during a training process of the machine-learning model in a particular manner, this disclosure contemplates updating the trainable variables of a machine-learning model during a training process of the machine-learning model in any suitable manner.

Figure 6:
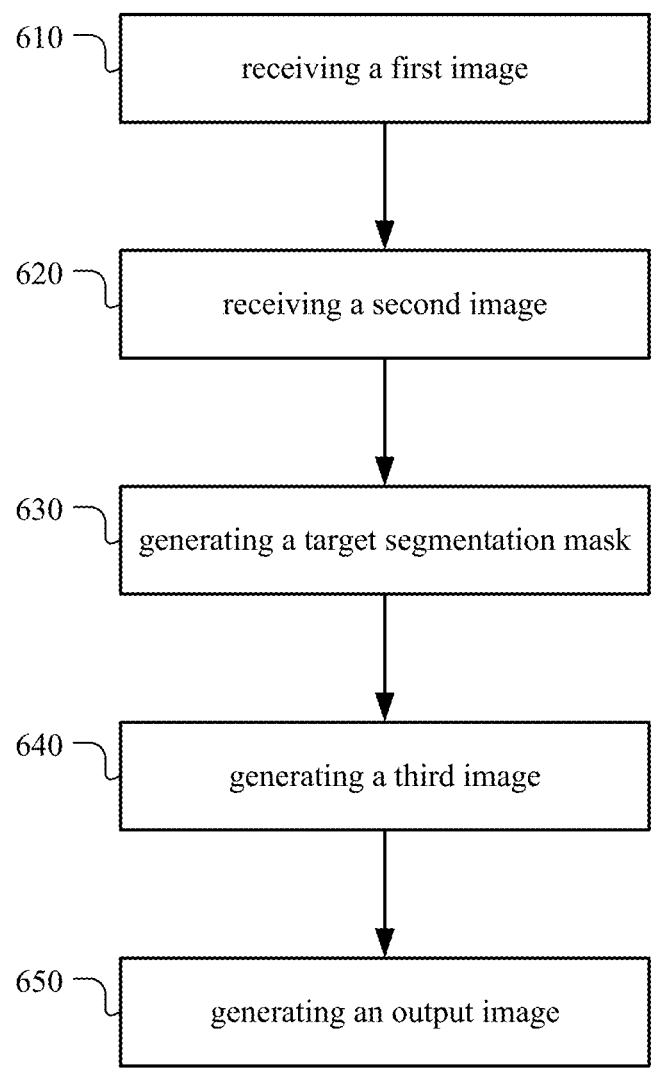
FIG. 6 illustrates an example method for inserting a context-adapted person into an existing image that comprises one or more persons.

FIG. 6 illustrates an example method 600 for inserting a context-adapted person into an existing image that comprises one or more persons. The method may begin at step 610, where the computing device 101 may receive a first image depicting a context comprising one or more persons having one or more respective poses. At step 620, the computing device 101 may receive a second image depicting a target person having an original pose. The computing device 101 may insert the target person into the context depicted in the first image. At step 630, the computing device 101 may generate a target segmentation mask specifying a new pose for the target person in the context of the first image based on the first image. At step 640, the computing device 101 may generate a third image depicting the target person having the new pose based on the second image and the target segmentation mask. At step 650, the computing device 101 may generate an output image based on the first image and the third image. The output image may depict the one or more persons having the one or more respective poses and the target person having the new pose. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for inserting a context-adapted person into an existing image that comprises one or more persons including the particular steps of the method of FIG. 6, this disclosure contemplates any suitable method for inserting a context-adapted person into an existing image that comprises one or more persons including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
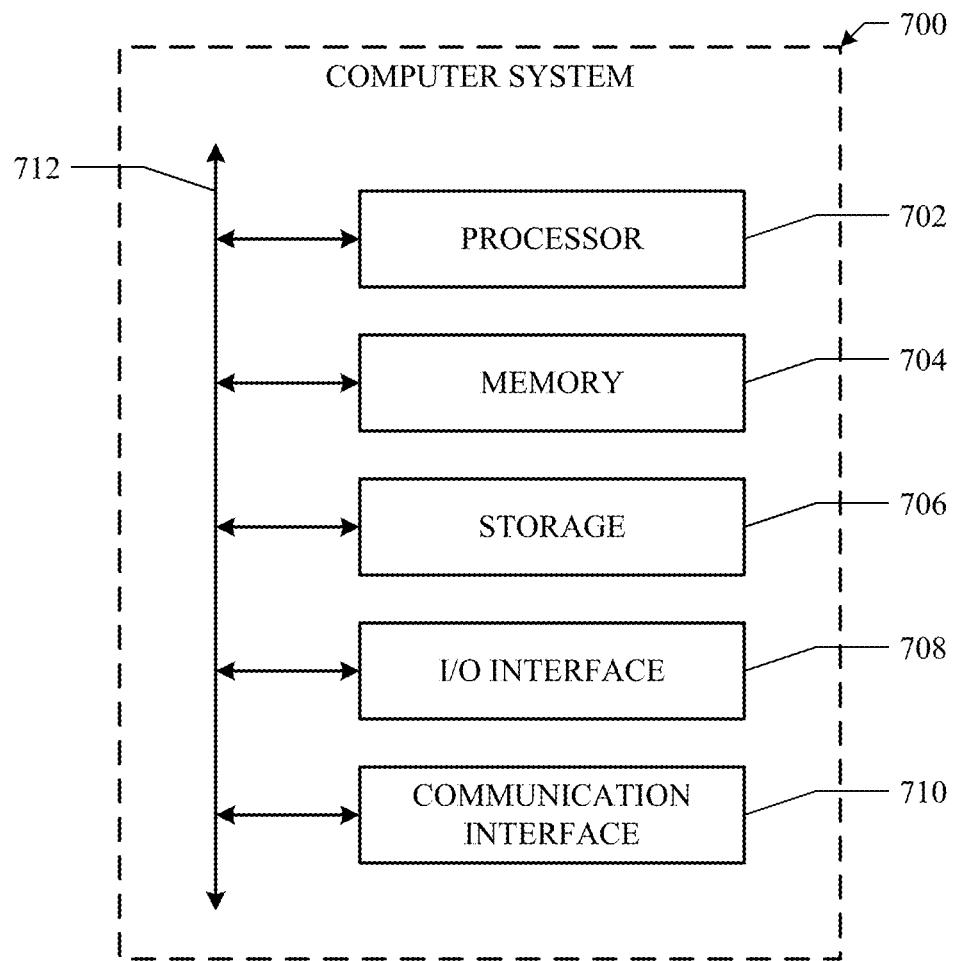
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these.

Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   receiving a first image depicting a context comprising one or more persons having one or more respective poses;
   receiving a second image depicting a target person having an original pose, wherein the target person is to be inserted into the context depicted in the first image;
   generating, based on the first image, a target segmentation mask specifying a new pose for the target person in the context of the first image;
   generating, based on the second image and the target segmentation mask, a third image depicting the target person having the new pose; and
   generating an output image based on the first image and the third image, the output image depicting the one or more persons having the one or more respective poses and the target person having the new pose.

2. The method of claim 1, wherein generating the target segmentation mask comprises:
   generating a source segmentation mask specifying the one or more respective poses of the one or more persons using one or more pre-trained machine-learning models; and
   processing the source segmentation mask with a first machine-learning model.

3. The method of claim 2, wherein a segmentation mask comprises a semantic pose map channel and a face channel.

4. The method of claim 3, wherein the semantic pose map channel comprises n labels corresponding to n segment groups, wherein n segment groups comprise background, hair, face, torso, upper limbs, upper-body wear, lower-body wear, lower limbs, shoes, or any other suitable segment group.

5. The method of claim 3, wherein the face channel is extracted based on convex hulls over detected facial keypoints for faces in an image, and wherein the face channel is a binary representation.

6. The method of claim 2, wherein information regarding a bounding box is also provided to the first machine-learning model, wherein the bounding box indicates an area in the first image to which the target person is to be added, and wherein the bounding box is determined by a user.

7. The method of claim 2, wherein the first machine-learning model is trained with a set of training data, wherein each training data comprises a training source image and a training ground truth image.

8. The method of claim 7, wherein the set of training data is prepared by:
   collecting a plurality of training ground truth images, each training ground truth image comprising two or more persons; and
   generating, for each training ground truth image, a training source image by removing one of the two or more persons.

9. The method of claim 8, wherein, during a training process of the first machine-learning model, trainable variables of the first machine-learning model are updated based on a comparison of a first target segmentation mask generated by the first machine-learning model based on a training source image and a second target segmentation mask computed from a corresponding training ground truth image.

10. The method of claim 1, wherein generating the third image comprises:
    segmenting the target person having the original pose in the second image into k segment classes such that each segment class is captured in a sub-image;
    generating a latent representation by processing the k sub-images with an encoder of a second machine-learning model; and
    generating the third image by processing the latent representation and the target segmentation mask by a decoder of the second machine-learning model.

11. The method of claim 10, wherein k segment classes comprise hair, face, upper-body wear, lower-body-wear, skin, shoes, or any other suitable segment class.

12. The method of claim 10, wherein the decoder of the second machine-learning model comprises a plurality of up-sample layers with interleaving segmentation mask input layers, and wherein each of the segmentation mask input layers takes the target segmentation mask as an input.

13. The method of claim 12, wherein the interleaving segmentation mask input layers are SPADE blocks.

14. The method of claim 10, wherein the decoder of the second machine-learning model also produces a first blending mask, wherein the first blending mask is a binary representation indicating an area in the output image that is to be filled by the target person in the third image.

15. The method of claim 14, wherein generating the output image comprises compositing the first image multiplied by an inverse of the first blending mask and the third image multiplied by the first blending mask.

16. The method of claim 1, further comprising:
    generating a first encoding vector corresponding to a face of the target person having an expression in the context of the first image by processing a face crop of the target person from the output image with an encoder of a third machine-learning model;
    generating a second encoding vector representing face features of the target person by processing the second image with a pre-trained machine-learning model;
    generating a temporary image comprising a refined face of the target person by processing the first encoding vector and the second encoding vector with a decoder of the third machine-learning model; and
    blending the generated refined face into the output image.

17. The method of claim 16, wherein the refined face has the face features of the target person in the second image and the expression of the face of the target person in the output image.

18. The method of claim 16, wherein the decoder of the third machine-learning model also produces a second blending mask, wherein the second blending mask represents a blending weight to be applied to the temporary image at each pixel of the output image, and wherein blending the generated refined face into the output image comprises:
    multiplying an inverse of the second blending mask to the output image; and
    projecting the temporary image multiplied by the second blending mask to the output image.

19. One or more computer-readable non-transitory storage media embodying software that is operable when executed to:
    receive a first image depicting a context comprising one or more persons having one or more respective poses;

receive a second image depicting a target person having an original pose, wherein the target person is to be inserted into the context depicted in the first image;

generate, based on the first image, a target segmentation mask specifying a new pose for the target person in the context of the first image;

generate, based on the second image and the target segmentation mask, a third image depicting the target person having the new pose; and generate an output image based on the first image and the third image, the output image depicting the one or more persons having the one or more respective poses and the target person having the new pose.

20. A system comprising: one or more processors; and a non-transitory memory coupled to the processors comprising instructions executable by the processors, the processors operable when executing the instructions to:

receive a first image depicting a context comprising one or more persons having one or more respective poses;

receive a second image depicting a target person having an original pose, wherein the target person is to be inserted into the context depicted in the first image;

generate, based on the first image, a target segmentation mask specifying a new pose for the target person in the context of the first image;

generate, based on the second image and the target segmentation mask, a third image depicting the target person having the new pose; and generate an output image based on the first image and the third image, the output image depicting the one or more persons having the one or more respective poses and the target person having the new pose.

\* \* \* \* \*